United States Patent
Kim et al.

(10) Patent No.: US 11,410,428 B2
(45) Date of Patent: Aug. 9, 2022

(54) VEHICLE AND CONTROL METHOD THEREOF

(71) Applicants: Hyundai Motor Company, Seoul (KR); Kia Motors Corporation, Seoul (KR); Hyundai Autron Co., Ltd., Seongnam-si (KR)

(72) Inventors: Bong Ju Kim, Yongin-si (KR); Byung-Jik Keum, Seoul (KR); Ho-Jun Kim, Seoul (KR); Sungsuk Ok, Hwaseong-si (KR)

(73) Assignees: Hyundai Motor Company, Seoul (KR); Kia Motors Corporation, Seoul (KR); Hyundai Autoever Corp., Seoul (KR)

( * ) Notice: Subject to any disclaimer, the term of this patent is extended or adjusted under 35 U.S.C. 154(b) by 242 days.

(21) Appl. No.: 16/577,754

(22) Filed: Sep. 20, 2019

(65) Prior Publication Data

US 2020/0193182 A1     Jun. 18, 2020

(30) Foreign Application Priority Data

Dec. 17, 2018 (KR) .......................... 10-2018-0162922

(51) Int. Cl.
    *G06V 20/58*          (2022.01)
    *G06T 7/20*            (2017.01)
    *G06T 7/70*            (2017.01)
    *G06V 20/56*          (2022.01)

(52) U.S. Cl.
CPC ................ *G06V 20/58* (2022.01); *G06T 7/20* (2013.01); *G06T 7/70* (2017.01); *G06V 20/588* (2022.01); *G06T 2207/20024* (2013.01); *G06T 2207/30261* (2013.01)

(58) Field of Classification Search
CPC .......... G06K 9/00805; G06K 9/00798; G06K 9/6289; G06T 7/20; G06T 7/70; G06T 7/277; G06T 7/246; G06T 2207/30261; G06T 2207/20024; G06T 2207/10028; G06T 2207/30241; G06T 2207/10024; B60W 40/02; B60W 30/08; B60W 2050/0022; B60W 2050/0052; B60W 2420/42; B60W 2420/52; B60W 2554/4042; G01S 5/0294; G06V 20/58; G06V 20/588; B60R 21/0134; B60Y 2400/30

See application file for complete search history.

(56) References Cited

U.S. PATENT DOCUMENTS

| | | | |
|---|---|---|---|
| 9,652,031 B1 * | 5/2017 | Savastinuk | ............ G06F 3/011 |
| 10,634,793 B1 * | 4/2020 | Siao | ........................ G06T 5/002 |
| 2003/0169413 A1 * | 9/2003 | Stanek | ..................... G06K 9/74 |
| | | | 356/2 |

(Continued)

*Primary Examiner* — Carol Wang
(74) *Attorney, Agent, or Firm* — Slater Matsil, LLP

(57) ABSTRACT

A vehicle includes a sensor unit configured to acquire positional information of at least one object located in the vicinity of the vehicle, the sensor unit comprising a plurality of sensor modules. A controller is configured to determine a tracking filter based on a correspondence relationship between the plurality of sensor modules and the at least one object and to track the position of the at least one object using the positional information of the at least one object and the tracking filter.

16 Claims, 13 Drawing Sheets

(56) References Cited

U.S. PATENT DOCUMENTS

| | | | | |
|---|---|---|---|---|
| 2003/0184468 | A1* | 10/2003 | Chen | G06T 5/40 |
| | | | | 342/52 |
| 2011/0025548 | A1* | 2/2011 | Nickolaou | G01S 13/931 |
| | | | | 342/52 |
| 2012/0062747 | A1* | 3/2012 | Zeng | G06K 9/00798 |
| | | | | 348/149 |
| 2012/0147191 | A1* | 6/2012 | Snoussi | G08B 13/19608 |
| | | | | 348/159 |
| 2015/0310281 | A1* | 10/2015 | Zhu | G06K 9/00805 |
| | | | | 382/104 |
| 2016/0259980 | A1* | 9/2016 | Mlybari | G06T 7/277 |
| 2016/0320476 | A1* | 11/2016 | Johnson | G06T 7/246 |
| 2017/0372149 | A1* | 12/2017 | Mori | G06K 9/00805 |
| 2018/0128609 | A1* | 5/2018 | Down | G01S 7/4808 |
| 2018/0204470 | A1* | 7/2018 | Rezvani | G08G 5/0034 |
| 2018/0306912 | A1* | 10/2018 | Branson | G01S 13/931 |
| 2020/0090011 | A1* | 3/2020 | Ream | G06F 17/16 |

\* cited by examiner

VEHICLE AND CONTROL METHOD THEREOF

CROSS-REFERENCE TO RELATED APPLICATIONS

This application claims priority to Korean Patent Application No. 10-2018-0162922, filed in the Korean Intellectual Property Office on Dec. 17, 2018, which application is hereby incorporated herein by reference.

TECHNICAL FIELD

The present invention relates to a vehicle related to a method of tracking an object around an optimized vehicle and a control method thereof.

BACKGROUND

A vehicle can derive a relationship between the vehicle and an object around the vehicle based on a sensor provided in the vicinity of the vehicle. The sensors provided in the vehicle may include a camera, a radar, and a LIDAR.

On the other hand, a sensor fusion technique for improving convenience by assisting a driver in operating a plurality of pieces of information obtained from the various sensors of the vehicle in real time using 'fusion' has been developed and gradually increased in its application range.

In order to acquire information related to the object in the vicinity of the vehicle, sensor data received during running of the vehicle is collected, and the sensor fusion is performed after passing through a filter.

That is, a method of performing the sensor fusion through a single type or a single number of the filters is generally performed for a plurality of the sensor data received from various surrounding environments.

However, when designing the single type or the single number of the filters for the sensor data received from a single sensor or a plurality of the sensors, it is difficult to ensure optimal signal processing performance and it is difficult to secure robust filter performance against noise or the surrounding environment.

Therefore, an efficient fusion method for selecting a filter suitable for a driving environment of a vehicle and selecting a filter has been actively studied.

SUMMARY

The present invention provides an electronic module and its control method capable of efficiently and safely managing vehicle information in a specific time domain even in the event of an accident or the like of an autonomous vehicle.

In accordance with one aspect of the present disclosure, a vehicle comprises a sensor unit configured to acquire positional information of at least one object located in the vicinity of the vehicle and comprising a plurality of sensor modules. A controller is configured to determine a tracking filter based on a correspondence relationship between the plurality of sensor modules and the at least one object and track the position of the at least one object using the positional information of the at least one object and the tracking filter.

The controller may be configured to track the position of the at least one object using the positional information of the at least one object and the tracking filter when one of the sensor modules of the plurality of sensor modules corresponds to one of the objects.

The controller may be configured to track the position of the one object using the tracking filter included in a second tracking filter when one of the plurality of sensor modules corresponds to a plurality of the objects.

The controller may be configured to track the position of the one object using the tracking filter included in a first tracking filter when the plurality of sensor modules correspond to the one object when the plurality of sensor modules correspond to the one object.

The controller may be configured to determine the reliability of each of the plurality of sensor modules based on the position of the one tracked object and track the position of the one object based on providing a weight factor to the positional information of the one object obtained by each of the plurality of sensor modules based on the reliability.

The controller is configured to derive a predicted path of the at least one object based on the positional information of the at least one object, track the position of the at least one object by comparing the positional information of the at least one object obtained in real time with the predicted path.

The controller is configured to ignore the change in an expected path of the at least one object when tracking the position of the at least one object.

The sensor unit is configured to obtain lane information on which the vehicle travels.

The controller is configured to track the position of a plurality of the objects based on the lane information and a moving speed of the at least one object.

In accordance with one aspect of the present disclosure a control method of a vehicle comprises acquiring positional information of at least one object located in the vicinity of the vehicle, determining a tracking filter based on a correspondence relationship between a plurality of sensor modules and the at least one object, and tracking the position of the at least one object using the positional information of the at least one object and the tracking filter.

The determining of the tracking filter may comprise tracking the position of the at least one object using the positional information of the at least one object and the tracking filter when one of the sensor modules of the plurality of sensor modules corresponds to one of the objects.

The determining of the tracking filter may comprise tracking the position of the one object using the tracking filter included in a second tracking filter when one of the plurality of sensor modules corresponds to a plurality of the objects.

The determining of the tracking filter may comprise tracking the position of the one object using the tracking filter included in a first tracking filter when the plurality of sensor modules correspond to one of the objects when the plurality of sensor modules correspond to one of the objects.

BRIEF DESCRIPTION OF THE DRAWINGS

These above and/or other aspects of the disclosure will become apparent and more readily appreciated from the following description of exemplary embodiments, taken in conjunction with the accompanying drawings in which.

DETAILED DESCRIPTION OF ILLUSTRATIVE EMBODIMENTS

Figure 1:
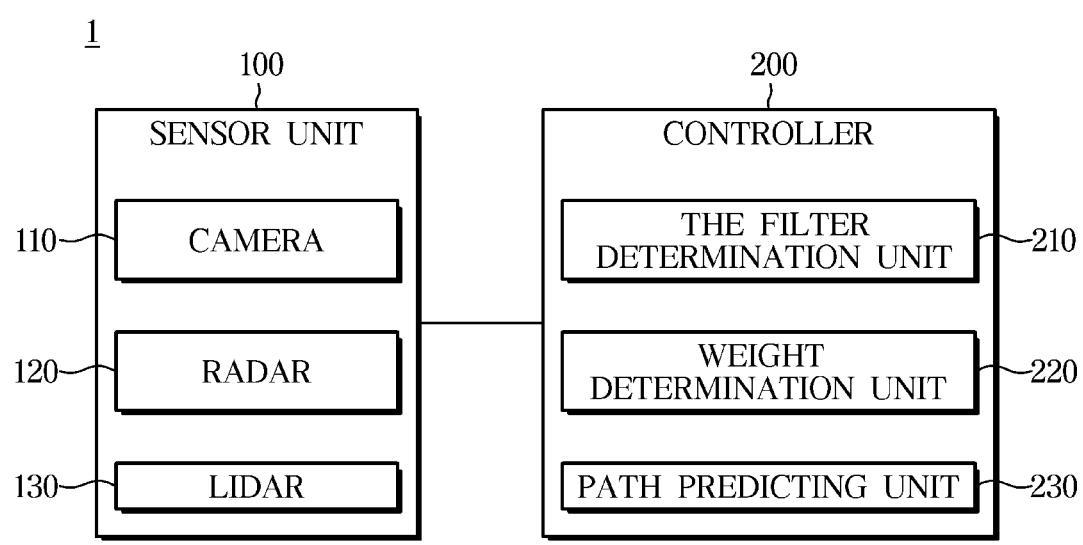
FIG. 1 is a control block diagram of a vehicle according to an embodiment.

Like numbers refer to like elements throughout this specification and in the drawings. This specification does not describe all components of the embodiments, and general information in the technical field to which the present disclosure belongs or overlapping information between the embodiments is also not described. The terms "part," "module," "element," and "block," as used herein, may be implemented as software or hardware, and in the disclosed embodiments, a plurality of "parts," "modules," "elements," and "blocks" may be implemented as a single component, or a single "part," "module," "element," and "block" may include a plurality of components.

It will be understood that when a component is referred to as being "connected" to another component, it can be directly or indirectly connected to the other component. When a component is indirectly connected to another component, it may be connected to the other component through a wireless communication network.

Also, it will be understood that the terms "includes," "comprises," "including," and/or "comprising," when used in this specification, specify the presence of a stated component, but do not preclude the presence or addition of one or more other components.

It will be understood that, although the terms first, second, third, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations. Also, the operations can be executed in a different order from the stated order unless a specific order is definitely specified in the context.

Hereinafter, the operation principle and embodiments of the present disclosure are described with reference to the accompanying drawings.

FIG. 1 is a control block diagram of a vehicle according to an embodiment.

Referring to FIG. 1, a vehicle 1 may include a sensor unit 100 and a controller 200.

The sensor unit 100 includes a plurality of sensor modules and can acquire positional information of at least one object located in the vicinity of the vehicle.

The plurality of sensor modules may correspond to a camera 110, a radar 120, and a LIDAR 130.

The camera no may be provided on the front, rear, and side of the vehicle to acquire images.

The camera no may include a Charge-Coupled Device (CCD) camera or a CMOS color image sensor. Here, both CCD and CMOS refer to a sensor which converts light received through a lens of the camera into an electric signal and stores it.

Specifically, the CCD (Charge-Coupled Device) camera no is a device that converts an image into an electric signal using a charge-coupled device.

In addition, CIS (CMOS Image Sensor) refers to a low-power, low-power type image pickup device having a CMOS structure and serves as an electronic film of a digital device.

Generally, the CCD is more sensitive than the CIS and is widely used in the vehicle 1, but the present invention is not limited thereto.

The radar 120 is provided with a sensor module that emits an electromagnetic wave of a microwave (microwave, 10 cm to 100 cm wavelength) to an object and receives electromagnetic waves reflected from the object to find the distance, direction, altitude and the like between the vehicle and the object.

The LIDAR 130 may be provided as a sensor module that emits laser pulses, reflects light from the surrounding object, returns to the object, measures the distance to the object, and so forth, to accurately depict the surroundings.

The controller 200 can determine a tracking filter based on the correspondence between the plurality of sensor modules and the at least one object.

A correspondence relationship can be distinguished in four correspondence relationships in the present invention because of the matching relationship between the number of the objects and the sensor module. A detailed description related thereto will be described later.

A trace filter may refer to a filter that collects sensor data received and then passes it before performing sensor fusion.

The tracking filter according to an exemplary embodiment may be classified into a single target tracking filter (STT) and a multi-target tracking filter (MIT).

Single Target Tracking (STT) includes Nearest Neighbor (NN), Probability Data Association (PDA), and Integrated Probabilistic Data Association (IPDA).

Multi-Target Tracking (MTT) includes a technique that uses Multiple Hypothesis Tracking (MHT), Joint Probabilistic Data Association (JPDA), Linear Multi-Target-Integrated Probabilistic Data Association filter target—(LM-IPDA).

The controller 200 may track the position of at least one object using the positional information of the at least one object and the tracking filter. The detailed operation in which the controller tracks the position of the object will be described later.

The controller 200 may track the position of the one object using the tracking filter included in a first tracking filter when one sensor module of the plurality of sensor modules corresponds to the one object.

The first tracking filter may refer to the single target tracking filter (STT) described above.

When the sensor module and the object correspond to each other in a one-to-one correspondence, the controller can select to use the first tracking filter to derive the position of the object.

The controller may track the position of the plurality of objects using the tracking filter included in the first tracking filter if each of the plurality of sensor modules corresponds to the plurality of objects.

When the plurality of objects is positioned around the vehicle and each of the plurality of objects corresponds to the plurality of sensor modules, one of the objects corresponds to one of the sensor modules. The controller 200 tracks the position of the object using the first tracking filter.

The controller 200 may track the position of the one object using the tracking filter included in a second tracking filter if the plurality of objects are associated with one of the sensor modules of the plurality of sensor modules.

The second tracking filter may refer to the multi-target tracking filter (MIT).

When the sensor module acquires the positional information of the plurality of objects other than the sensor module, the controller 200 can track the position of the object located in the vicinity of the vehicle using the second tracking filter.

If the plurality of sensor modules and one of the objects correspond to each other, the controller 200 can track the position of the one object using the tracking filter included in the first tracking filter.

In this case, it may mean that the plurality of sensor modules acquire one of the objects positional information.

Meanwhile, the determination of the above-described tracking filter may be performed in a filter determination unit 210 provided in the controller 200.

In this case, the controller 200 may determine the reliability of each of the plurality of sensor modules based on the position of the one tracked object.

That is, the positional information of the derived object and the positional information of the acquired object of each of the sensor modules are compared with each other, so that the reliability related to whether or not each of the sensor modules has acquired the reliable positional information can be derived.

On the other hand, the controller can weigh the positional information of the one object obtained by each of the plurality of sensor modules based on the reliability, and track the position of the one object.

Meanwhile, this operation can be performed by a weight determination unit 220 provided in the controller 200.

The controller 200 may derive a predicted path of the at least one object based on the positional information of the at least one object.

On the other hand, a path predicting unit 230 provided in the controller 200 can derive the estimated route.

The path predicting unit 230 can newly generate a predicted path when the longitudinal and lateral coordinate values of the object output from the sensor unit 100 are maintained for a predetermined period of time.

If the predicted path generated immediately before and the positional information of the currently sensed object are within a certain distance value, the path predicting unit 230 can regard the information of the current object as the predicted path and maintain the predicted path.

The path predicting unit 230 plays a role of deleting the estimated path if no more detected positional information is input to the expected path for a predetermined time.

The path predicting unit 230 can manage the error covariance values of the estimated path and the coordinates of the estimated path in order to manage the tracks repeatedly in the entire system.

On the other hand, the controller 200 may track the position of at least one of the objects by comparing the predicted path with the positional information of the at least one object obtained in real time.

The controller 200 can ignore the change of the predicted path of the at least one object by tracking the position of the at least one object.

That is, when the controller 200 starts tracking one of the objects around the vehicle, the object is continuously tracked on the basis of the object, so there is less need to acquire a predicted path that the vehicle travels.

The controller 200 can ignore the change of the predicted path.

The sensor unit 100 can acquire lane information on which the vehicle travels.

In addition, the sensor unit 100 can also acquire the lane information on which the object around the vehicle is traveling.

The controller 200 may track the position of a plurality of the objects based on the lane information and the moving speed of the at least one object. A detailed description related thereto will be described later.

The controller 200 includes a memory (not shown) for storing data for a program reproducing an algorithm or an algorithm for controlling the operation of components in the vehicle, and a processor (not shown) for performing the above-described operation using the data stored in the memory (not shown). At this time, the memory and the processor may be implemented as separate chips. Alternatively, the memory and the processor may be implemented in a single chip.

At least one component may be added or deleted corresponding to the performance of the components of the vehicle shown in FIG. 1.

It will be readily understood by those skilled in the art that the mutual position of the components can be changed corresponding to the performance or structure of the system.

In the meantime, each of the components shown in FIG. 1 denotes a hardware component such as software and/or a Field Programmable Gate Array (FPGA) and an Application Specific Integrated Circuit (ASIC).

FIGS. 2A to 2D are diagrams illustrating a driving environment in which a vehicle travels according to an exemplary embodiment.

Figure 2A:
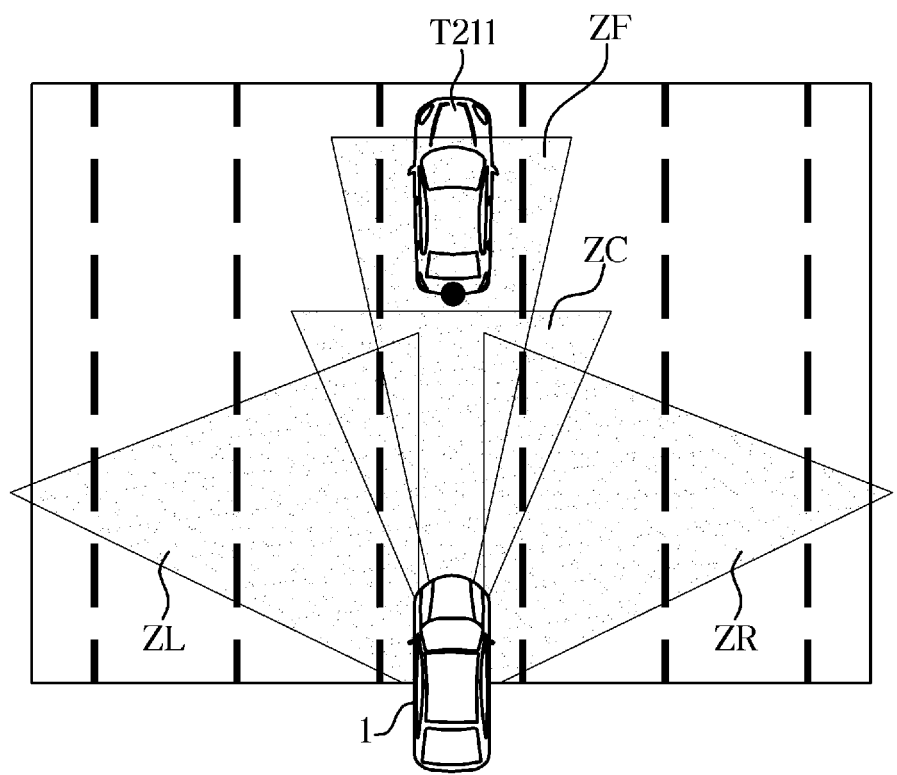
FIGS. 2A to 2D are views showing a driving environment in which a vehicle travels according to an embodiment.

Referring to FIG. 2A, a case where one sensor module of a plurality of the sensor modules corresponds to one object is shown.

Each of the sensor modules provided in the vehicle can detect the object in a long-distance zone ZF, a middle-distance zone ZC and side zones ZL and ZR of the vehicle.

FIG. 2A shows a case where the sensor module provided in the vehicle acquires the positional information of a single object T211 provided in the long-distance zone ZF.

The controller may track the position of the single object T211 using the tracking filter included in the first tracking filter when one of the sensor modules corresponding to the long-distance zone ZF and the single object T211 located in the long-distance zone ZF correspond to each other among the plurality of sensor modules provided in the vehicle.

Figure 2B:
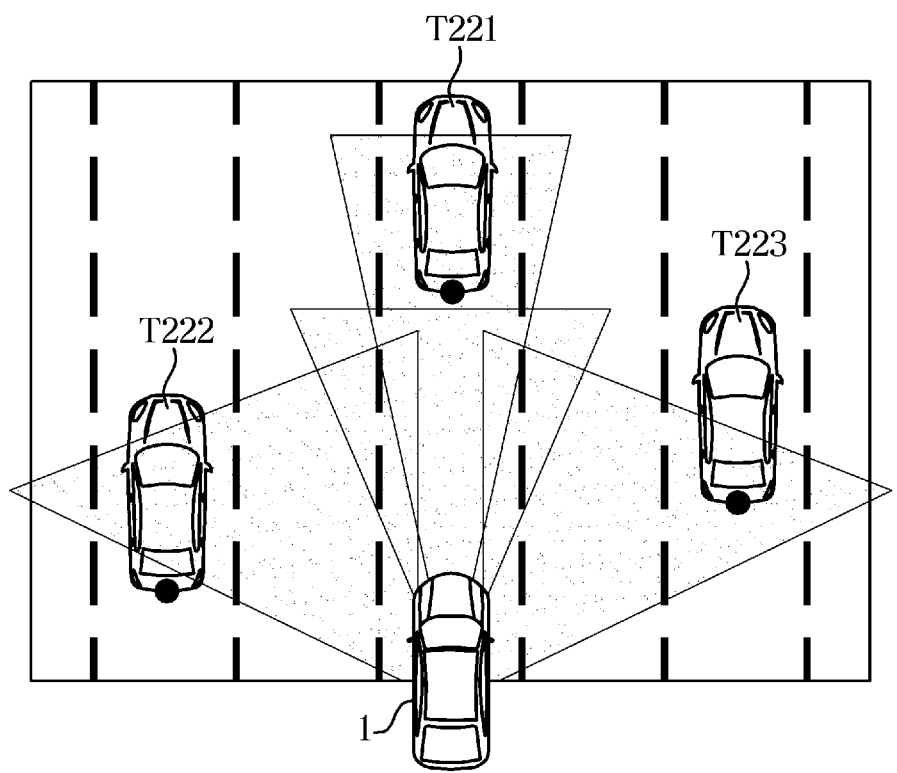

Referring to FIG. 2B, the plurality of sensor modules and a plurality of objects T221, T222, and T223 correspond to each other.

FIG. 2B shows a case where the sensor module provided in the vehicle acquires the positional information of each of the objects T221, T222 and T223 provided in the long-distance zone ZF, the middle-distance zone ZC and the side zones ZL and ZR.

That is, each of the plurality of sensor modules provided in the vehicle may correspond to each of the objects T221, T222, and T223.

That is, the long-distance zone ZF sensor module may correspond to the object T221, and the side zones ZL and ZR sensor modules may correspond to the objects T222 and T223.

When one of the sensor modules corresponding to each region corresponds to one of the objects, the controller can track the position of the object using the tracking filter included in the first tracking filter.

Figure 2C:
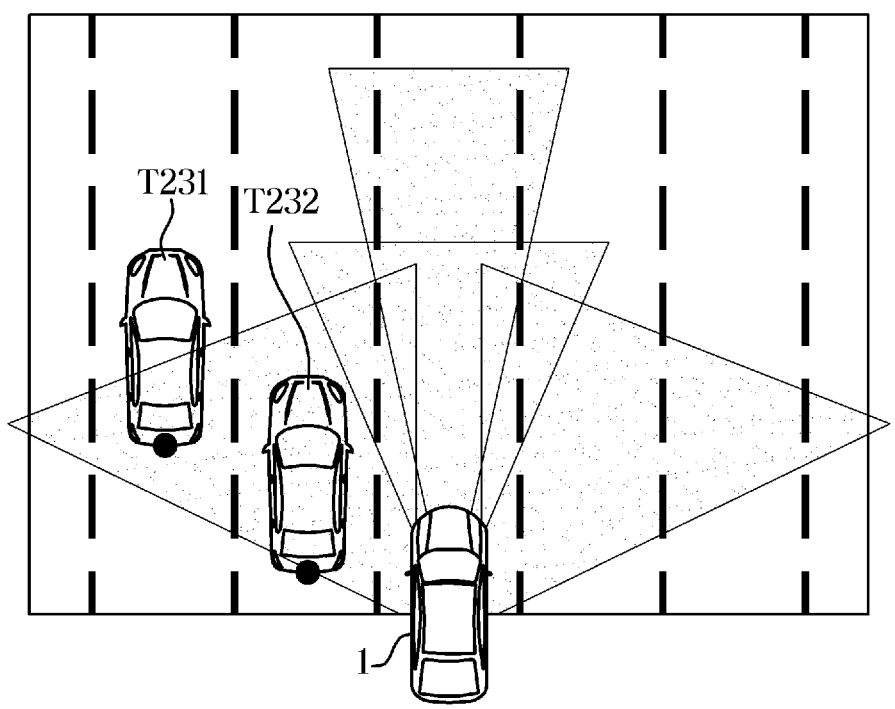

Referring to FIG. 2C, a case where one of the sensor modules of the plurality of sensor modules corresponds to the plurality of objects is shown.

FIG. 2C shows a case where a side real-time sensor module provided in the vehicle acquires the positional information of a plurality of objects T231 and T232 provided in the side zone ZL.

That is, when one of the sensor modules among the plurality of sensor modules provided in the vehicle corresponds to the plurality of objects, the controller can track the position of the one object using the tracking filter included in the second tracking filter.

Figure 2D:
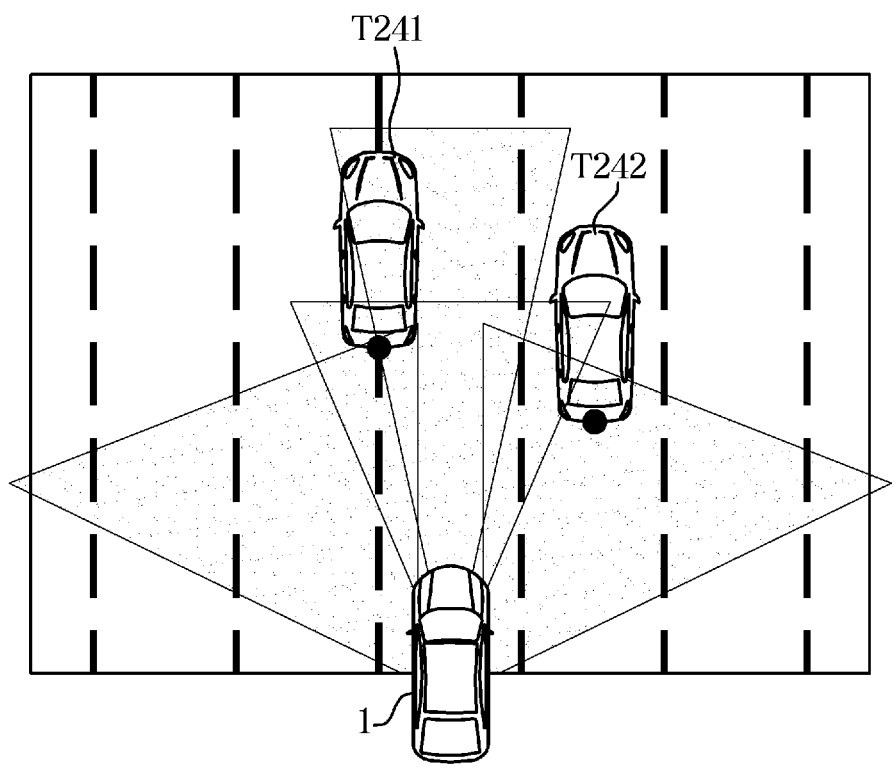

Referring to FIG. 2D, the plurality of sensor modules and the plurality of single objects correspond to each other.

FIG. 2D shows a case in which the sensor modules of the side zones ZL and ZR provided in the vehicle and the sensor module of the middle-distance zone ZC acquire the positional information of a plurality of objects T241 and T242.

That is, when the plurality of sensor modules of the plurality of sensor modules provided in the vehicle correspond to one of the objects, the controller may track the position of the one object using the tracking filter included in the first tracking filter.

The controller may determine the reliability of each of the plurality of sensor modules based on the position of the one tracked object.

The controller may weigh the positional information of the one object acquired by each of the plurality of sensor modules based on the reliability to track the position of the one object.

For the objects T242, the positional information of the objects T242 can be obtained by both the middle-distance zone ZC sensor module and the side zone ZR sensor module provided in the vehicle.

In the case where the plurality of sensor modules tracks a common object, it may mean that a sensor fusion operation is performed as well as a tracking filter technique for individual sensor modules.

In FIG. 2D, when the plurality of sensor modules track one of the objects, the tracking filter of each of the sensor modules may be changed to the tracking filter of the sensor having the highest accuracy among some of the sensors.

If the sensor module of the middle-distance zone ZC in FIG. 2D correctly acquires the position of the object T242, the side zone ZR sensor module can use the filter used by the middle-distance zone ZC sensor module.

The controller may weigh the positional information output from the tracking filter by each of the sensor modules.

In FIG. 2D, when the positional information of the object obtained by the sensor module of the middle-distance zone ZC is determined to be accurate, the controller may assign a high weight to the sensor module of the middle-distance zone ZC.

The controller can assign the positional information of the final object by applying a low weight to the sensor zone of the side zone ZR.

On the other hand, the driving situation of the vehicle described in FIGS. 2A to 2D is merely for explaining an embodiment of the present invention.

There is no restriction on the operation of selecting the appropriate tracking filter according to the driving situation and performing the sensor fusion.

Figure 3:
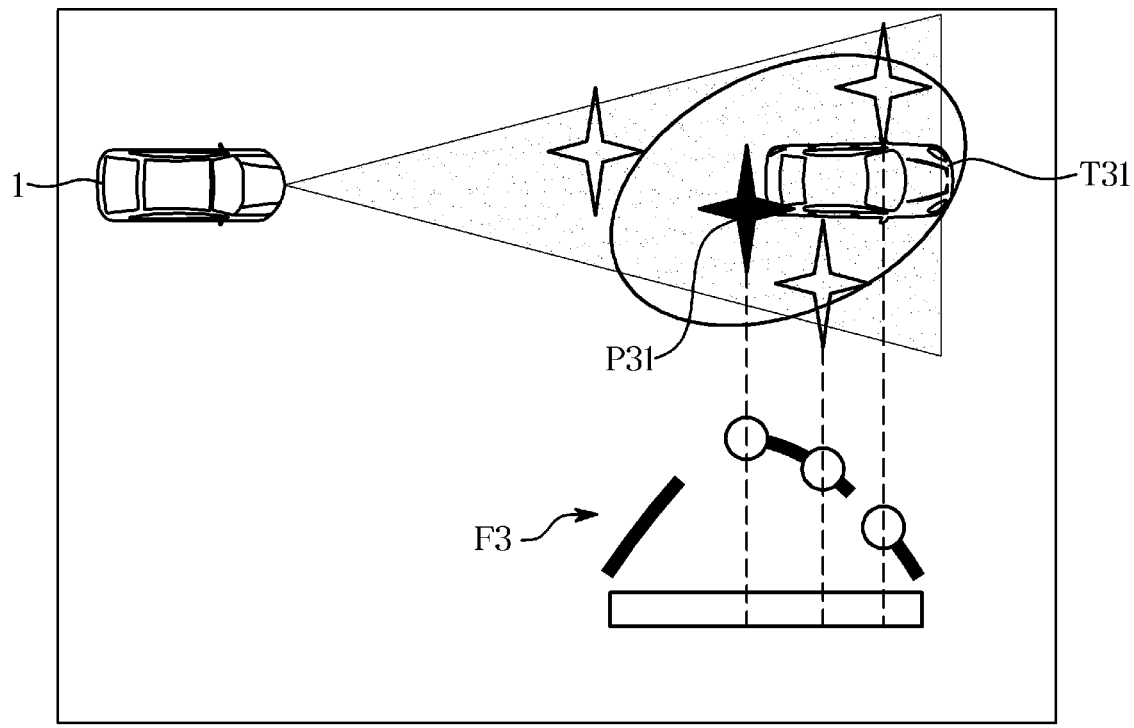
FIGS. 3 and 4 are diagrams for explaining positional information of an object around a vehicle according to an embodiment.
Figure 4:
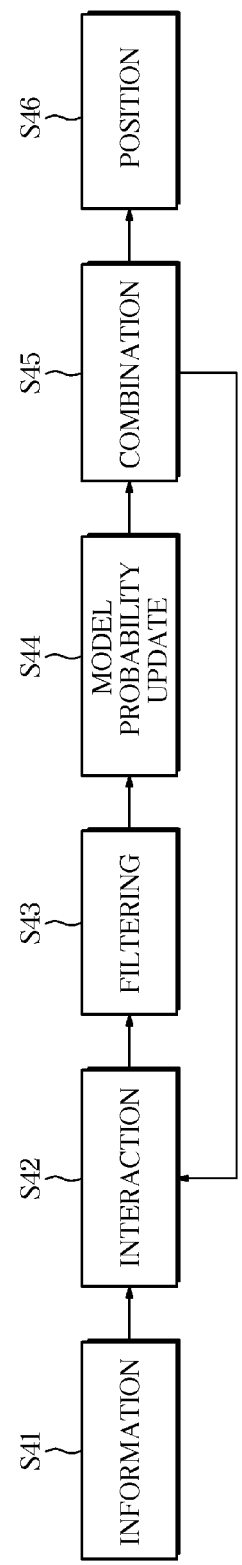

FIGS. 3 and 4 are diagrams for explaining positional information of an object around a vehicle according to an embodiment.

Referring to FIG. 3, the sensor module provided in the vehicle can obtain positional information P31 of the object.

The controller can predict the positional information of the obtained object through a Kalman filter F3.

Referring to FIG. 4, the controller acquires positional information of the object through an interaction (S42) between the sensor module and the object, and performs filtering (S43) on the object.

Also, the controller can calculate the filtered information by using probability model information (Model Probability update, S44).

The controller can combine the calculated probability model information (S45) to derive the positional information of the object.

Referring to FIGS. 3 and 4 together, the controller can predict the position of the object by the above-described method.

The controller gates the predicted positional information of the object to extract reliable information.

The controller can predict and extract the positional information of the object based on the operation of FIG. 4

The controller can continuously track the position of the object by modeling the position of the object and finally correcting it.

FIGS. 3 and 4 illustrate operations according to an embodiment of the tracking filter of the present invention.

The present invention is not limited to the operation of continuously tracking the position of the object.

Figure 5A:
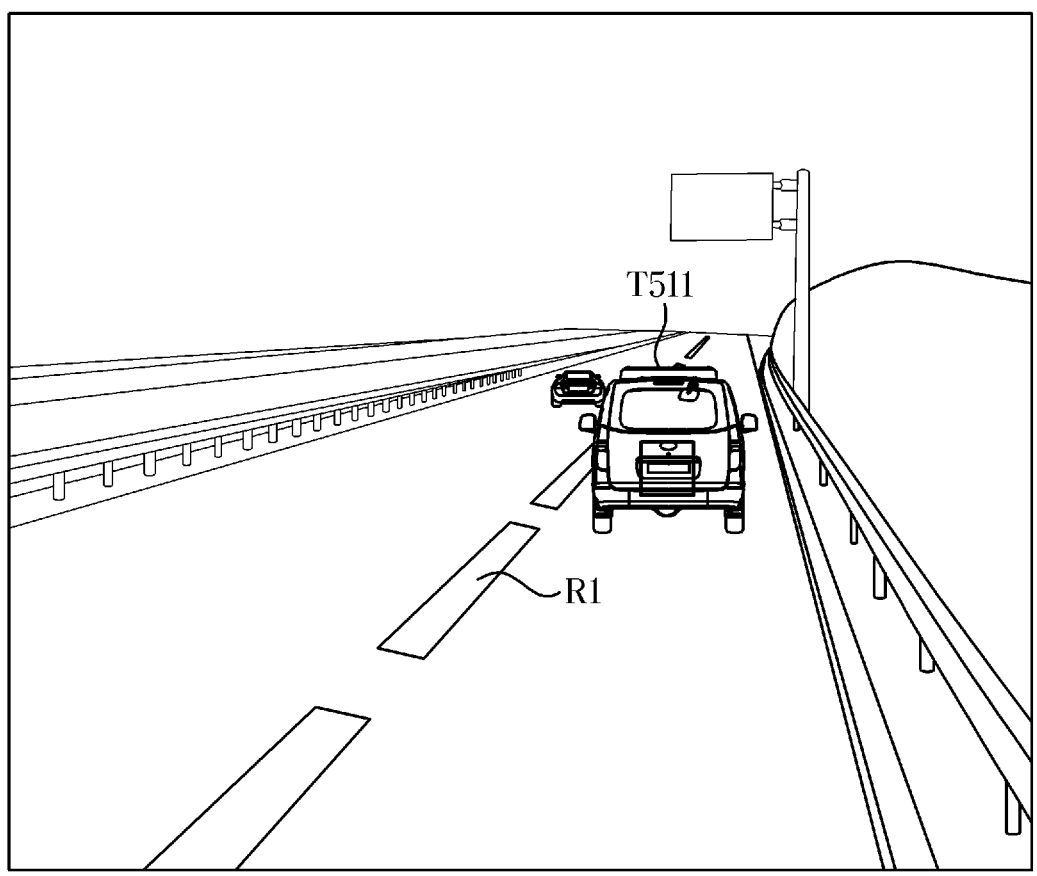
FIGS. 5A to 5C are diagrams for explaining an operation of deriving a predicted travel route of a vehicle according to an embodiment.
Figure 5B:
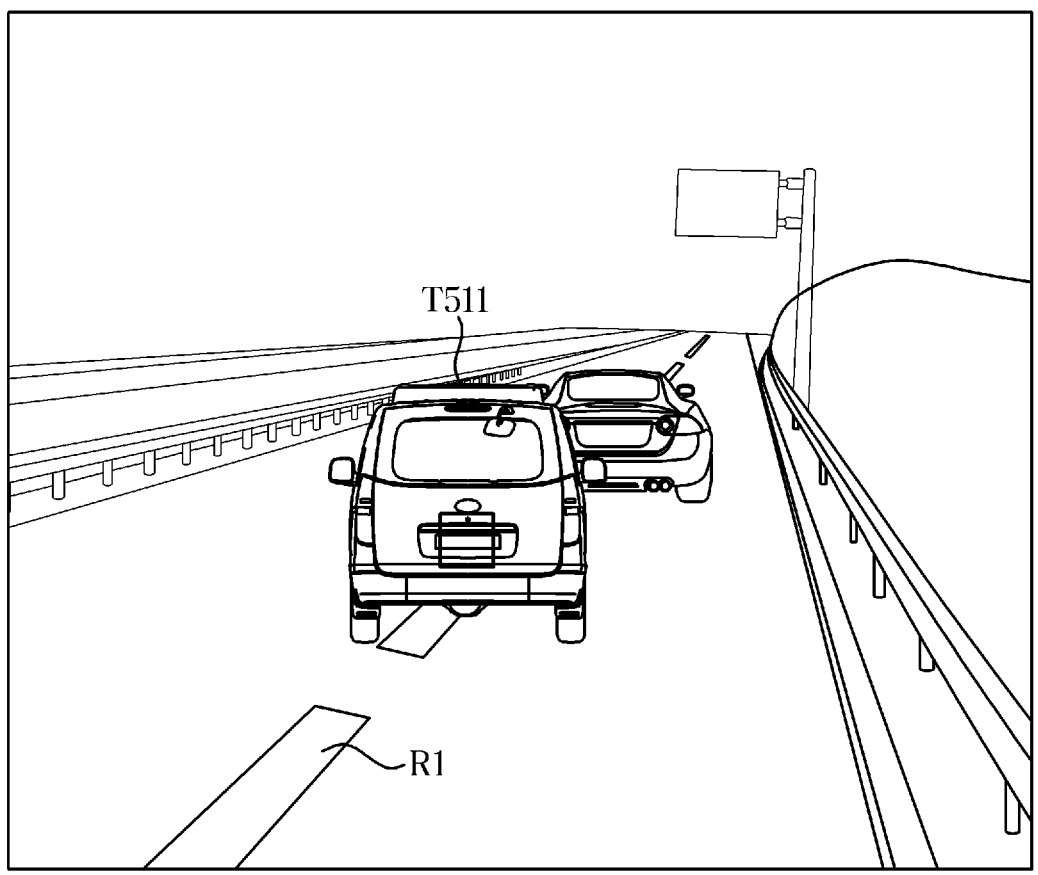
Figure 5C:
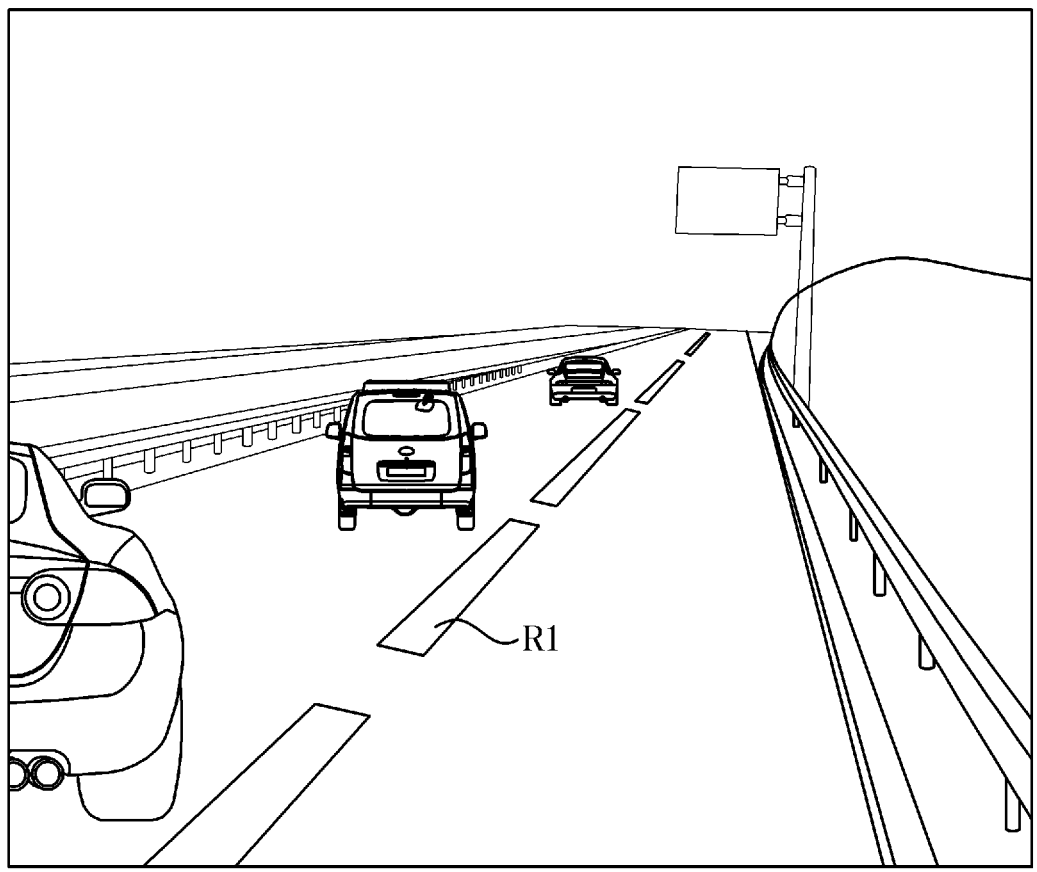

FIGS. 5A to 5C are diagrams for explaining an operation for deriving a predicted traveling route of a vehicle according to an embodiment.

As described above, the controller can derive a predicted path R1 of the object based on the positional information of the object.

Specifically, a track path predicting unit can newly generate a predicted path when the longitudinal and lateral coordinate values of the object output from the sensor unit are maintained for a predetermined time.

The track path predicting unit may determine the current coordinate value to be the predicted path if the predicted path generated immediately before and the coordinate value of the currently sensed object are within a certain distance value.

At this time, the controller maintains the predicted path, and if the detected coordinate value is not input to the predicted path for a predetermined time, the predicted path can be removed.

Also, the path predicting unit can manage the error covariance value of the estimated path and the coordinate of the predicted path in order to recursively manage the predicted paths in the entire system.

The controller can use a tracking filter having good performance when the coordinate value of the object of the radar is recognized as the final estimated path, and corresponds to one of the sensor modules per one of the objects that do not require the sensor fusion.

By using the IPDA or the LM-IPDA, the probability of existence of the track is reflected in the error covariance value of the path predicting unit, and the path predicting unit can contribute to the improvement of the accuracy of the entire tracking system.

In this case, the control section does not perform the operation of the sensor fusion, while the operation related to the tracking filter may increase.

On the other hand, when the sensor fusion is required, the controller can use a relatively simple type of tracking filter.

The controller does not need to reflect the probability of existence of the track in the error covariance value to be managed by a track manager, so that a calculation load can be reduced.

Referring to FIG. 5A, the sensor unit provided in the vehicle can predict the predicted path of the object based on the positional information of a forward object.

On the other hand, the controller can track the location (T511) of the object based on the derived predicted path R1 and the acquired location information of the object.

Referring to FIG. 5B, when the controller starts to track the position of the object, it is not necessary to derive an additional predicted path as long as the tracking is started. Therefore, the controller ignores the change of the predicted path R1 of the object.

In other words, if the position of the object is tracked, the predicted path of the object is no longer derived, thus the amount of calculation of the controller itself can be reduced.

Referring to FIG. 5C, if there is no forward object with a high risk in the vehicle, the controller may not generate the expected path.

It is advantageous to reduce the calculation load of the controller.

On the other hand, FIGS. 5A to 5C are merely examples for calculating the predicted path of the object in the present invention.

There is no restriction on the operation of a robot if it is an operation of tracking the position of the object using the expected path of the object and the positional information of the object itself.

Figure 6A:
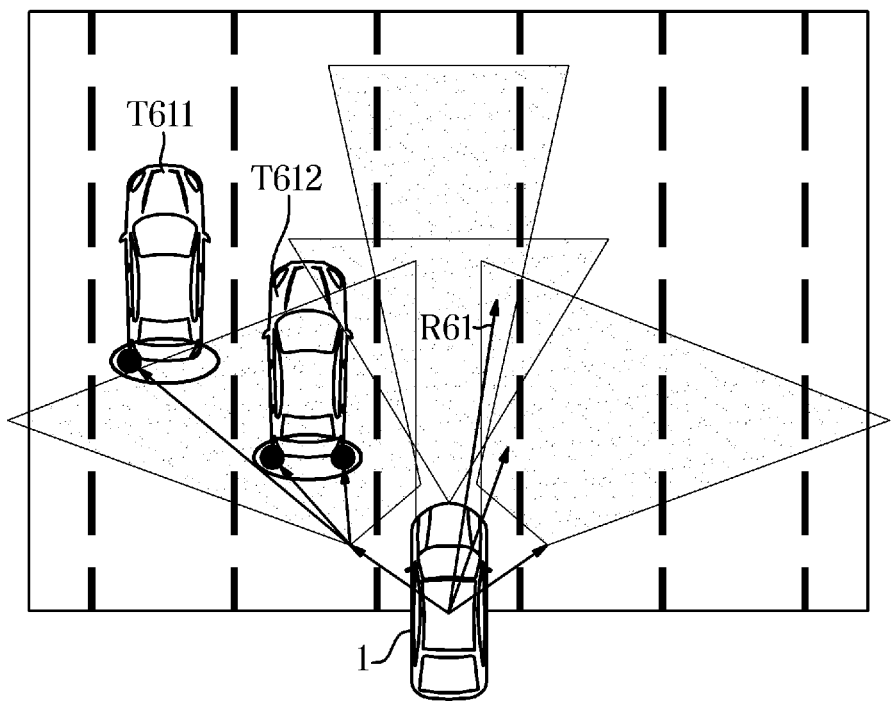
FIGS. 6A and 6B are views for explaining an operation of tracking an object around a vehicle using lane information according to an embodiment.
Figure 6B:
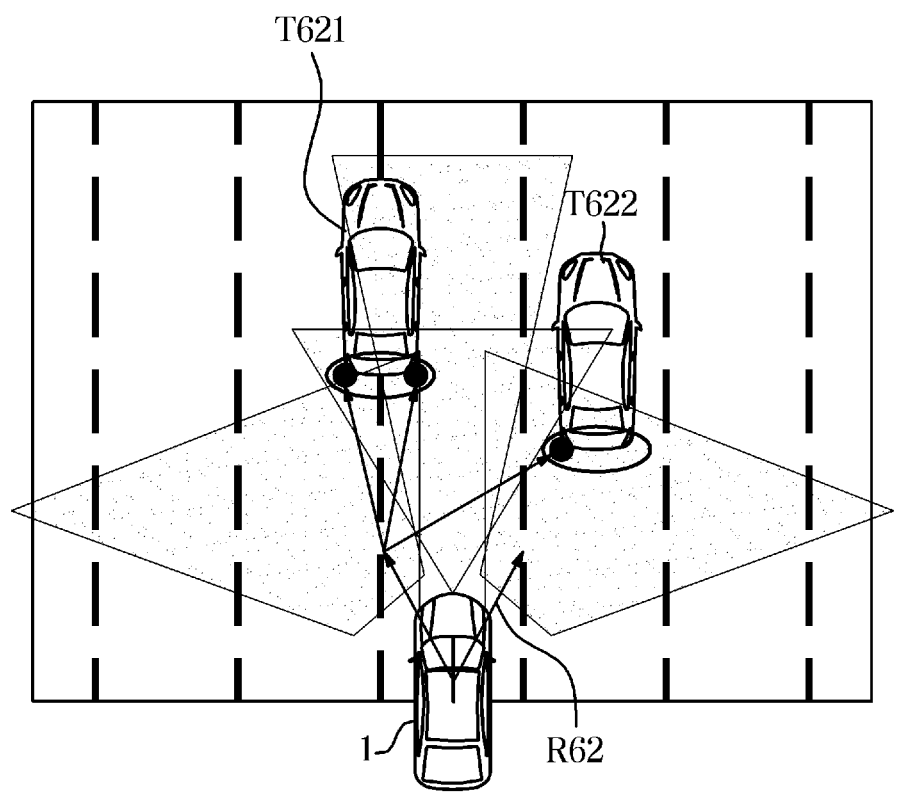

FIGS. 6A and 6B are views for explaining an operation of tracking an object around a vehicle using lane information according to an embodiment.

Referring to FIG. 6A, in order to confirm the reliability of whether the plurality of objects are actually different objects or the same objects, the controller can perform calculation using running lane information R61.

More specifically, the sensor unit can acquire the lane information R61 to be traveled.

The controller can determine that the vehicle is in the normal running state when the lane moving speed recognized by the camera is within a specific range.

The controller can determine the relative speed of each of the objects with respect to the moving speed of the lane while driving the vehicle.

The controller can determine the same object if the relative moving speed between an object T611 and an object T612 is within a specific range and is within the lane width of the lane moving speed.

Referring to FIG. 6B, the plurality of sensor modules may differ in accuracy and reliability depending on the type, and thus an operation for confirming the reliability of a cavity object may be performed.

The controller can determine the lane moving speed based on the vehicle running information (the wheel speed, the accelerator pedal, the brake pedal, the steering angle, and the steering angle speed).

The controller may determine the normal running state when the vehicle state information and the speed and position of the information acquired by the sensor unit are within a specific range.

The controller can calculate the relative moving speed of each of an object T621 and an object T622 with respect to the moving speed of the lane during driving.

The controller can determine the same object if the relative moving speed between the object T621 and the object T622 is within a specific range and is within the lane width of the lane moving speed.

On the other hand, FIGS. 6A and 6B are merely examples for improving the reliability of the positional information of the object based on the lane information on which the vehicle travels, and the present invention is not limited to this operation.

Figure 7:
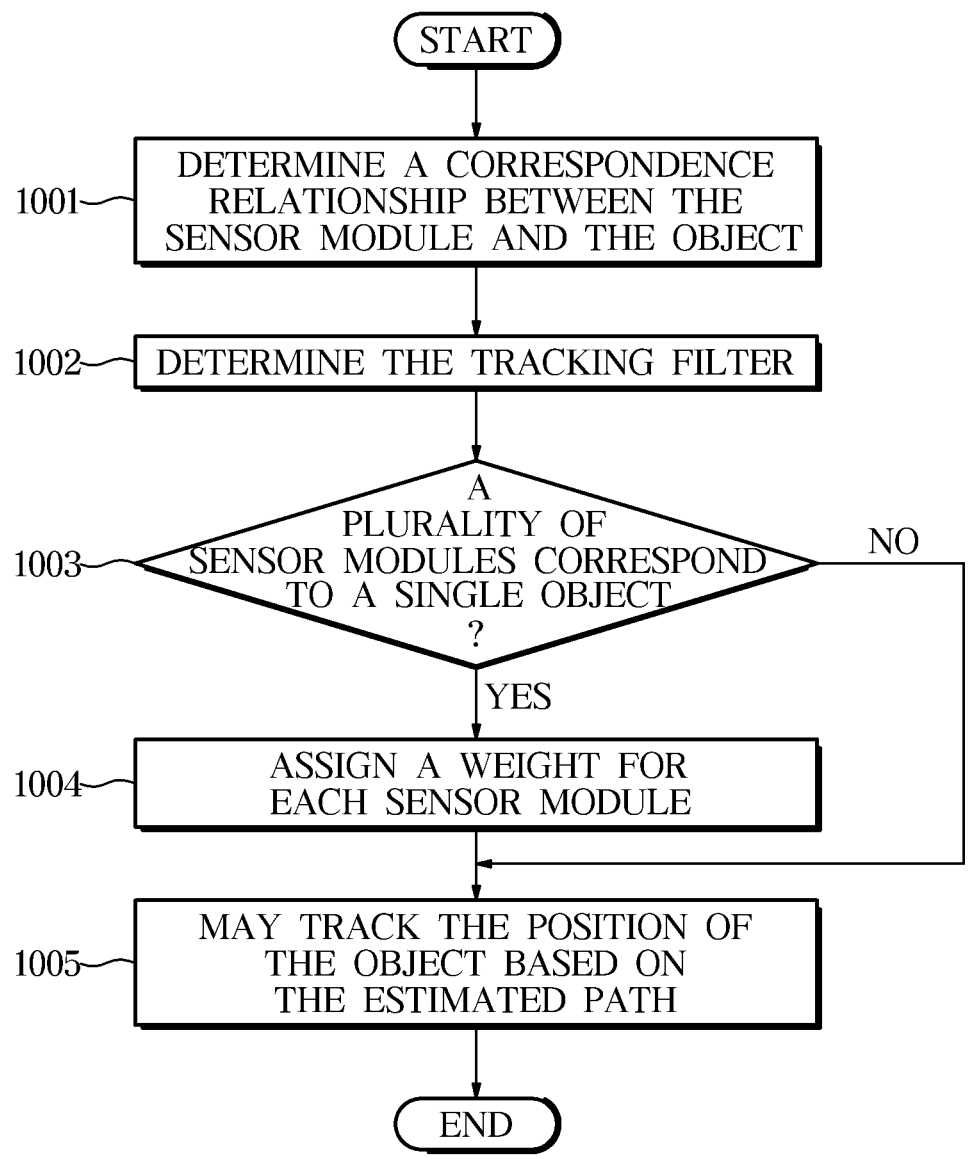
FIG. 7 is a flowchart according to an embodiment.

FIG. 7 is a flowchart according to an embodiment.

Referring to FIG. 7, the controller may determine a correspondence relationship between the sensor module and the object (1001).

Further, the controller may determine the tracking filter based on the corresponding relationship (1002).

Meanwhile, when the plurality of sensor modules correspond to a one of the objects (1003), the controller may perform a sensor fusion operation to assign a weight for each of the sensor modules (1004).

Further, the controller may track the position of the object based on the estimated path and the above-described operation (1005).

Meanwhile, the embodiments as described above may be embodied in the form of a recording medium to store commands that can be executed by a computer. The commands may be stored in the form of program codes, and can create a program module, when executed by the processor, to perform the operations of the above-described embodiments. The recording medium may be embodied as a computer-readable recording medium.

The computer-readable recording medium may be or include any kind of recording device to store commands that can be interpreted by a computer. For example, the computer-readable recording medium may be ROM, RAM, a magnetic tape, a magnetic disk, flash memory, or an optical data storage device.

For the vehicle and the control method thereof according to the embodiments of the present disclosure, by recognizing the driving situation of the vehicle upon autonomous driving, and controlling the components of the vehicle when a dangerous situation is sensed, safe autonomous driving is possible.

Although various embodiments of the present disclosure have been shown and described herein, it should be appreciated by those having ordinary skill in the art that changes may be made in the disclosed embodiments without departing from the principles and spirit of the disclosure, the scope of which is defined in the claims and their equivalents.

What is claimed is:

1. A vehicle comprising:
   a sensor unit configured to acquire positional information of at least one object located in a vicinity of the vehicle, the sensor unit comprising a plurality of sensor modules; and
   a controller configured to select one tracking filter of a plurality of tracking filters based on a correspondence relationship between the plurality of sensor modules and the at least one object and to track a position of the at least one object using the positional information of the at least one object and the selected tracking filter;
   wherein the controller is configured to track the position of the at least one object using the selected tracking filter when the plurality of sensor modules correspond to the at least one object; and
   wherein the controller is configured to determine a reliability of each of the plurality of sensor modules based on the position of the at least one object and track the position of the at least one object based on providing a weight factor to the positional information of the at least one object obtained by each of the plurality of sensor modules based on the reliability.

2. The vehicle according to claim 1, wherein the controller is configured to track the position of the at least one object using the positional information of the at least one object and the selected tracking filter when one of the sensor modules of the plurality of sensor modules corresponds to the at least one object.

3. The vehicle according to claim 1, wherein the at least one object comprises a plurality of objects and wherein the controller is configured to track the position of one object of the plurality of objects using a second tracking filter when one of the plurality of sensor modules corresponds to more than one of the objects.

4. The vehicle according to claim 1, wherein the controller is configured to derive a predicted path of the at least one object based on the positional information of the at least one object, and to track the position of the at least one object by comparing the positional information of the at least one object obtained in real time with the predicted path.

5. The vehicle according to claim 1, wherein the controller is configured to ignore a change in an expected path of the at least one object when tracking the position of the at least one object.

6. The vehicle according to claim 1,
wherein the at least one object comprises a plurality of objects;
wherein the sensor unit is configured to obtain lane information on which the vehicle travels; and
wherein the controller is configured to track a position of the plurality of the objects based on the lane information and a moving speed of at least one object of the plurality of objects.

7. A control method of a vehicle comprising:
acquiring positional information of at least one object located in a vicinity of the vehicle;
selecting one tracking filter of a plurality of tracking filters based on a correspondence relationship between a plurality of sensor modules and the at least one object; and
tracking a position of the at least one object using the positional information of the at least one object and the selected tracking filter;
wherein the at least one object comprises a plurality of objects;
wherein selecting the one tracking filter comprises tracking a position of one object using the tracking filter included in a first tracking filter when the plurality of sensor modules correspond to the one object; and
wherein the method further comprises determining a reliability of each of the plurality of sensor modules based on the position of the at least one object and tracking the position of the at least one object based on providing a weight factor to the positional information of the at least one object obtained by each of the plurality of sensor modules based on the reliability.

8. The method according to claim 7, wherein selecting the one tracking filter comprises tracking the position of the at least one object using the positional information of the at least one object and the selected tracking filter when one of the sensor modules of the plurality of sensor modules corresponds to the at least one object.

9. The method according to claim 7, wherein the at least one object comprises a plurality of objects and wherein selecting the one tracking filter comprises tracking the position of one object using a second tracking filter when one of the plurality of sensor modules corresponds to the plurality of the objects.

10. The method according to claim 7, further comprising deriving a predicted path of the at least one object based on the positional information of the at least one object and tracking the position of the at least one object by comparing the positional information of the at least one object obtained in real time with the predicted path.

11. The method according to claim 7, wherein a change in an expected path of the at least one object is ignored when tracking the position of the at least one object.

12. The method according to claim 7, wherein the at least one object comprises a plurality of objects, the method further comprising obtaining lane information on which the vehicle travels and tracking the position of the plurality of the objects based on the lane information and a moving speed of at least one object of the plurality of objects.

13. A control method of a vehicle comprising:
acquiring positional information of a plurality of objects located in a vicinity of the vehicle;
selecting one tracking filter of a plurality of tracking filters based on a correspondence relationship between a plurality of sensor modules and the plurality of objects, wherein the selected tracking filter is a first tracking filter when the plurality of sensor modules correspond to one of the objects and wherein the selected tracking filter is a second tracking filter that is different than the first tracking filter when one of the plurality of sensor modules corresponds to more than one of the objects; and
tracking a position of each of the objects using positional information of that object and the selected tracking filter.

14. The method according to claim 13, further comprising determining a reliability of each of the plurality of sensor modules based on the position of the tracked objects.

15. The method according to claim 13, further comprising deriving a predicted path of one of the objects based on the positional information of the one of the objects and tracking the position of the one of the objects by comparing the positional information of the one of the objects obtained in real time with the predicted path.

16. The method according to claim 13, further comprising obtaining lane information on which the vehicle travels and tracking the position of the plurality of objects based on the lane information and a moving speed of at least one object of the plurality of objects.

* * * * *